United States Patent [19]

Eichenauer et al.

[11] Patent Number: 4,769,417

[45] Date of Patent: Sep. 6, 1988

[54] NEW RUBBER POLYMERS WITH BLOCK-LIKE STRUCTURE

[75] Inventors: Herbert Eichenauer, Dormagen; Christian Lindner, Cologne; Karl-Heinz Ott, Leverkusen; Hartwig Höcker, Eckersdorf, all of Fed. Rep. of Germany

[73] Assignee: Bayer Aktiengesellschaft, Leverkusen, Fed. Rep. of Germany

[21] Appl. No.: 49,127

[22] Filed: May 12, 1987

Related U.S. Application Data

[63] Continuation-in-part of Ser. No. 875,568, Jun. 18, 1986, abandoned.

[30] Foreign Application Priority Data

Jun. 29, 1985 [DE] Fed. Rep. of Germany ....... 3523311

[51] Int. Cl.$^4$ ................................................ C08F 8/00

[52] U.S. Cl. .................................... 525/100; 525/101; 525/105; 528/14; 528/21; 528/23; 528/25; 528/26

[58] Field of Search ....................... 525/105, 100, 101; 528/26, 25, 21, 23, 14

[56] References Cited

U.S. PATENT DOCUMENTS

| | | | |
|---|---|---|---|
| 3,483,270 | 12/1969 | Bostick | 525/105 |
| 3,691,257 | 9/1972 | Kendrick et al. | 525/105 |
| 3,928,490 | 12/1975 | Hergenrother | 525/105 |
| 4,261,876 | 4/1981 | Reusser | 525/105 |

Primary Examiner—Melvyn I. Marquis
Attorney, Agent, or Firm—Connolly & Hutz

[57] ABSTRACT

The invention relates to new block copolymers consisting of recurring polysiloxane blocks and recurring conjugated diene homo-or copolymer blocks with particularly good rubber properties, in particular at low temperatures.

8 Claims, No Drawings

NEW RUBBER POLYMERS WITH BLOCK-LIKE STRUCTURE

This application is a continuation-in-part application of U.S. patent application Ser. No. 875,568, filed June 18, 1986 now abandoned.

The invention relates to new block copolymers consisting of recurring polysiloxane blocks and recurring conjugated diene homo-or copolymer blocks with particularly good rubber properties, in particular at low temperatures.

Various block copolymers are known, e.g. styrene/butadiene block copolymers, block copolymers of aliphatic polyesters and polyethers and polyesters of aromatic dicarboxylic acids or block copolymers based on aromatic polycarbonates.

In all these cases at least one polymer block has a softening behaviour which can be described as thermoplastic (its glass transition temperature is far above room temperature). These block copolymers are remarkable for special properties due to the combination of thermoplastic and rubber properties in one molecule.

On the other hand block copolymers in which each of the polymer blocks represent a rubber per se are little known.

It has been found that polymers constructed in a block-like manner based on polysiloxanes and segments which are derived from homo- or copolymers of on conjugated dienes have particularly interesting rubber properties such as easy vulcanizability and good fillability with known reinforcing fillers such as carbon black or titanium dioxide, better resistance to solvents and oils, good processability on rollers and kneaders and good elastic properties.

The subject of the invention are rubber polymers with block-structure consisting of recurring structural units (I)

$$[A-B]_n, \qquad (I)$$

n representing an integer of from 2 to 500, preferably of from 3 to 250,
and optionally recurring structural units (II)

$$[A'-C]_m \qquad (II)$$

m representing an integer of from 2 to 500, preferably of from 3 to 250,
which have a mean molecular weight ($\overline{M}_w$) of 10,000 to 1,000,000, preferably of 10,000 to 50,000 and of 100,000 to 500,000, wherein A and A' represent equal or different bifunctional polysiloxane segments of the formula (III)

$$[(R^1)(R^2)—SiO]_x \qquad (III)$$

with $R^1$ and $R^2$=aryl and/or alkyl, where x represents a number such that (III) has a mean molecular weight ($\overline{M}_w$) of >500, preferably >750, such as 500–2,000, preferably 1,000–10,000, and where A and A' have identical or chemically different structures, B represents bifunctional homo and/or copolymer segments of conjugated dienes these segments having mean molecular weights ($\overline{M}_w$)>800, preferably >1,000, especially 800–12,000, C represents bifunctional aliphatic polyester or aliphatic polyether segments with molecular weights ($\overline{M}_w$)>800, preferably >1,000, especially 800–12,000, and the glass transition temperatures of the polymeric blocks A, A', B and C are below 0° C., preferably below −20° C. Mean molecular weight $\overline{M}_w$ is the weight average of the molecular weight.

The segments B of the polymers according to the invention are preferably selected from the butadiene homopolymer or butadiene copolymers. Particularly preferred are butadiene copolymers containing up to 35% by weight, based on B of copolymerized monomers such as acrylonitrile, methacrylonitrile, styrene, halostyrene, p-methylstyrene, esters of methacrylic acid containing 1–12 C atoms in the alkanol component and esters of acrylic acid containing 1–12 C atoms in the alcohol component; preferred comonomers of butadiene are acrylonitrile, styrene, methyl methacrylate, n-butyl acrylate, ethyl acrylate or ethylhexyl acrylate.

As segments C polyalkylene oxide segments are preferred which contain $C_1$–$C_6$ alkylene units of bifunctional polyester radicals from the aliphatic $C_2$–$C_{12}$ dicarboxylic acid and aliphatic $C_2$–$C_{18}$ alkylene diol polycondensate series.

The amount of segments II in the rubber polymer can be zero, as this segment can be omitted. Its maximum amount is 100 parts by weight per 100 parts by weight of segment I, preferably up to 40 parts by weight per 100 parts by weight of segment I.

The invention furthermore provides process for the preparation of the polymers according to the invention wherein homo- and/or copolymer of conjugated dienes with terminal hydroxyl groups of the formula (IV)

$$HO—B—OH \qquad (IV),$$

optionally an aliphatic polyester or polyether diol of the formula (V)

$$HO—C—OH \qquad (V)$$

and a polysiloxane of the formula (VI)

$$R^3COO\ [(R^1)(R^2)SiO]_x COR^3 \qquad (VI)$$

with $R^1$ and $R^2$ independently=aryl (in particular phenyl) or alkyl (in particular methyl), $R^3$=$C_1$–$C_{18}$ alkyl and x=an integer, are polycondensed, optionally using catalysis or by means of acid-binding agents, with elimination of the $R^3$COOH acid, the polymer (IV) having a mean molecular weight ($\overline{M}_w$) of 800 to 12,000, the diol (V) a mean molecular weight ($\overline{M}_w$) of 800 to 12,000 and the polysiloxane (VI) a mean molecular weight ($\overline{M}_w$) of 500 to 20,000.

The polysiloxanes contained in the block co-polymers are polydialkyl, polydiaryl or polyarylalkyl siloxanes, in particular polydimethylsiloxane or polymethylsiloxane radicals. They have block molecular weights of 500 to 20,000, in particular 1,000 to 10,000; they are essentially linear.

The diene polymer segments forming the blocks B are derived from polymers of conjugated dienes (in particular butadiene, isoprene) and also from their copolymers with copolymerizable olefinic unsaturated compounds, in particular vinyl monomers.

The polyester segments forming the blocks C are derived from aliphatic saturated or unsaturated dicarboxylic acids, for example from oxalic acid, succinic acid, adipic acid, azelaic acid, sebacic acid, carbonic acid, maleic acid, fumaric acid, and butadienedicarboxylic acid. Particularly suitable as diol components of the polyesters are ethanediol, butanediol, hexanediol, neopentyl glycol, alkylene ether-diols with molecular weights up to about 150 and also unsaturated aliphatic diols such as butene diols and higher unsaturated dicarboxylic acids with more than 10 C atoms in the molecule. Suitable as blocks C are also polyether diol radicals from the polyalkylene ether series, for example polyformaldehyde radicals, polytetrahydrofuran radicals or polybutylene oxide radicals, polyethylene oxide radicals and also their copolymers.

At the same time not only polyester blocks or polyether blocks may be present as component C. A portion of the blocks C may be polyester and another portion polyether, and finally blocks C may also be present which contain ether and ester functions next to each other. If in addition to linear, branched polyester or polyether components are also used for the preparation of the block copolymers, block copolymers are contained (sic) which have branched but uncrosslinked structures.

Also suitable as blocks C are polyether or polyester blocks which themselves have a sequence or block structure, for example polyethylene oxide/polypropylene oxide block copolymer units and also polyester/polyether block copolymer units.

In the block copolymers according to the invention diene polymer blocks may be present combined not only with polysiloxane blocks, but also in additional combination with aliphatic polyester and/or polyether segments. Particularly preferred are polymers in the spirit of the invention which contain, polymerized in, up to 20% by weight, in particular up to 10% by weight (referred to the total weight of the rubber polymer) of a polyester, in particular based on adipic acid, or of a polyether with up to four C atoms in the alkylene group. The last-named cases then involve multiblock copolymers containing at least three chemically differently constructed polymer sequences. For special application requirements even multiblock copolymers in the spirit of the invention consisting of at least four chemcially different blocks are advantageous. Such products are especially well suited for rubber applications if the non-polysiloxane polymer sequences differ in their crystallization behaviour as may be the case, for example, with combinations of chemically differently constructed aliphatic polyesters.

The block copolymers according to the invention may be prepared by polycondensing bisacylated polysiloxanes of the formula (VI) with diene homo- and/or copolymers with terminal hydroxyl groups of the formula (IV) and optionally with polyether and/or polyester diols of the formula (V). Normally the starting components of the formulae (VI) and (IV) or (VI) and (IV)+(V) are used in equimolar quantities, but it may be advantageous to use one component or another in slight excess. The final molecular weight can then be controlled better and the nature of the terminal groups determined. In order to determine the molecular weight during the synthesis itself molecular weight regulators can be used, for example monofunctional compounds such as monoalcohols, monoacylated polysiloxanes, anhydrides, esters and acid chlorides.

The synthesis of the block copolymers can be carried out at temperatures from 40° to about 200° C., in particular at 80° to 150° C. Moreover it is possible to work with or without solvent, for example with aromatic hydrocarbons, paraffins, chlorinated hydrocarbons, liquid amides, esters, ketones, and ethers.

A preferred embodiment of the process starts without solvent and adds solvent at the end of the polycondensation.

Preferably catalysts and/or acid-binding agents are used, for example organic or inorganic bases such as salts (carbonates of alkali metals or alkaline earth metals) or soluble organic bases such as tertiary amines, and also phase transfer catalysts, phosphines, and Lewis bases are suitable. For certain reaction temperatures, working in the presence of catalytic quantities of strong acids is possibly advantageous, especially if the polycondensation is carried out with the acids formed (from the starting product VI) being distilled off.

The synthesis can be carried out discontinuously or continuously, and also in kneading units or screw units.

It is also advantageous to introduce the total quantity of the starting substance (VI) or (IV), or (IV) and (V) into the reactor and, depending on the progress of the reaction, to add the remaining quantities of the various starting components (IV) or (IV) and (V), or (VI) in metered amounts.

Following the synthesis the rubbers may be isolated, optionally accompanied by evaporation of the auxiliary solvent or filtering off of the products formed from the eliminated acid, and stabilized by conventional antioxidants or light-stabilizing agents.

The rubbers according to the invention are vulcanizable, for example with radical initiators or sulphur in combination with the known auxiliary vulcanization agents. They can be reinforced or stretched with especially large quantities of inorganic fillers. In the unvulcanized state the polymers according to the invention are suitable as tackifiers or crude adhesive products, in particular if they have a moderate molecular weight. In the vulcanized state the rubbers according to the invention are suitable for the preparation of coatings, sealing compounds, insulating compounds or damping materials, especially in the fields where high resistance to aggressive media and high low-temperature elasticity are required.

EXAMPLES

EXAMPLE 1

1,000 parts by weight of a copolymer of butadiene and acrylonitrile with terminal hydroxyl groups (acrylonitrile content=15% by weight, molecular weight determined from the OH number=5,000), 800 parts by weight of an $\alpha$, $\omega$-bisacetylated polydimethylsiloxane with a molecular weight of 4,000 (determined by acetyl determination), 100 parts by weight of $Na_2CO_3$, 300 parts by weight of toluene and eight parts by weight of 2,6-di(tert.-butyl)-4-methylphenol are reacted for four hours at 110° C.-120° C. The temperature is then raised as the viscosity of the solution increases to 130° C.-140° C. After a total reaction time of eight hours the solution is cooled down, filtered and the solvent is evaporated off. The resulting rubber product has an intrinsic viscosity of 0.99 dl/g (in tetrahydrofuran).

EXAMPLE 2

Example 1 is repeated, a product with an acrylonitrile content of 10% by weight being used as the butadiene/acrylonitrile copolymer with terminal hydroxyl groups. The resulting product has an intrinsic viscosity of 1.04 dl/g (in tetrahydrofuran).

EXAMPLE 3

1,000 parts by weight of a polybutadiene oil with terminal hydroxyl groups (molecular weight determined from the OH number=2,700), 1,480 parts by weight of an α, ω-bisacetylated polydimethylsiloxane with a molecular weight of 4,000 (determined by acetyl determination), 180 parts by weight of $Na_2CO_3$, 6,500 parts by weight of toluene and 10 parts by weight of 2,6-di(tert-butyl)-4-methylphenol are reacted for five hours at 110° C.–120° C.

The temperature is then raised to 130° C.–140° C. as the viscosity of the solution increases. After a total reaction time of 10 hours, the solution is cooled, filtered and the solvent evaporated off. The resulting rubber has an intrinsic viscosity of 0.86 dl/g (in THF).

EXAMPLE 4

500 parts by weight of the butadiene/acrylonitrile copolymer with terminal hydroxyl groups used in Example 1, 200 parts by weight of a polyester diol derived from adipic acid and neopentyl glycol/hexane diol in a weight ratio of 35:65 and a molecular weight of 2,000 (determined from the OH number), 800 parts by weight of the α, ω-bisacetylated polydimethyl siloxane used in Example 1, 100 parts by weight of $Na_2CO_3$, 3,000 parts by weight of toluene and eight parts by weight of 2,6-di(tert.-butyl)-4-methylphenol are reacted for 12 hours at 110° C.–120° C. The solution is cooled, filtered and the solvent evaporated off. The resulting rubber product has an intrinsic viscosity of 1.11 dl/g (in tetrahydrofuran).

EXAMPLE 5

Example 4 is repeated, a polytetrahydrofuran diol with a molecular weight of 2,000 (determined from the OH number) being used instead of the polyester diol. The rubber product has an intrinsic viscosity of 0.96 dl/g (in THF).

EXAMPLE 6

100 parts by weight of the rubber from Example 1, 20 parts by weight of carbon black, one part by weight of stearic acid and 1.2 parts by weight of sulphur are intimately mixed. From the mixture a strip is prepared which is vulcanized. The resulting material is insoluble in all solvents and has a good low-temperature elasticity.

We claim:

1. A rubber polymer with a block structure comprising recurring structural units of the general formula $$[A-B]_n \qquad (I)$$

wherein

A represents polysiloxane segments of the formula $$[(R^1)(R^2)SiO]_x \qquad (III)$$

in which
R$^1$ and R$^2$ denote aryl radicals, alkyl radicals or combinations thereof,
n is an integer from 2 to 500,
x represents a number such that segments (III) have a weight average molecular weight, $M_w$, of greater than 500 to 20,000;

B represents homo- or copolymer segments having weight average molecular weights, $M_w$, of 800 to 12,000, derived from conjugated diene monomers, and wherein the rubber polymer has a weight average molecular weight, $M_w$, of 10,000 to 1,000,000 and the glass transition temperatures of the polymer blocks A and B are below 0° C.

2. A rubber polymer according to claim 1 additionally comprising recurring structural units of the general formula $$[A'-C]_m$$

in which m is an integer of from 1 to 500, A' is defined as A above and
C represents bifunctional aliphatic polyester or aliphatic polyether segments with a weight average molecular weight, $M_w$, of 800 to 12,000.

3. A rubber polymer according to claim 1 in which the rubber polymer has a weight average molecular weight, $M_w$, of 10,000 to 50,000.

4. A rubber polymer according to claim 2 in which the rubber polymer has a weight average molecular weight, $M_w$, of 10,000 to 50,000.

5. A rubber polymer according to claim 1, in which the segment B represents a homopolymer segment derived from butadiene monomer or a copolymer segment derived from butadiene monomer and from 5 to 35% by weight based on B, of copolymerized monomers selected from acrylonitrile, methacrylonitrile, styrene, halostyrene, p-methylstyrene, or esters derived from (i) methacrylic acid or acrylic acid and (ii) an alcohol containing 1 to 12 carbon atoms.

6. A rubber polymer according to claim 2 in which the segment C contains $C_1$ to $C_6$ alkylene units of bifunctional polyester radicals selected from polycondensates of aliphatic $C_2$ to $C_{12}$ dicarboxylic acids and aliphatic $C_2$ to $C_{18}$ alkylene diols.

7. A process for the production of a rubber polymer according to claim 1, in which a homo- or copolymer of conjugated dienes with terminal hydroxyl groups of the general formula $$HO-B-OH \qquad (IV)$$

in which B has the same meaning as in claim 1, and also a polysiloxane of the general formula $$R^3COO-[(R^1)(R^2)SiO]COR^3 \qquad (VI)$$

in which R$^1$ and R$^2$ have the same meanings as in claim 1 and R$^3$ denotes a $C_1$ to $C_{18}$ alkyl radical,
are polycondensed with elimination of R$^3$COOH acid, and in which the compound of formula (IV) has a weight average molecular weight, $M_w$, of 800 to 12,000 and the compound of formula (VI) has a weight average molecular weight, $M_w$, of 500 to 20,000.

8. A process according to claim 7, in which the polycondensation of (IV) and (VI) further comprises polycondensing an aliphatic polyester, polyether diol or combination thereof of the formula $$HO-C-OH \qquad (V)$$

in which C represents segments derived from an aliphatic polyester, polyether or mixture thereof with a weight average molecular weight, $M_w$, of 800 to 12,000.

* * * * *